(12) United States Patent
Zhou et al.

(10) Patent No.: US 12,141,634 B2
(45) Date of Patent: Nov. 12, 2024

(54) DISPLAY CARD AND ELECTRONIC DEVICE WITH WIRELESS COMMUNICATION FUNCTION

(71) Applicant: ASUS GLOBAL PTE. LTD., Singapore (SG)

(72) Inventors: Jie Zhou, Singapore (SG); Xu Wang, Singapore (SG); Chao Xu, Singapore (SG); Jingwen Yao, Singapore (SG); Xilong Du, Singapore (SG); Qi Hu, Singapore (SG)

(73) Assignee: ASUS GLOBAL PTE. LTD., Singapore (SG)

( * ) Notice: Subject to any disclaimer, the term of this patent is extended or adjusted under 35 U.S.C. 154(b) by 83 days.

(21) Appl. No.: 17/985,170

(22) Filed: Nov. 11, 2022

(65) Prior Publication Data

US 2024/0028859 A1    Jan. 25, 2024

(30) Foreign Application Priority Data

Jul. 25, 2022  (CN) .......................... 202210878936.9

(51) Int. Cl.
*G06T 1/20* (2006.01)
*G06K 19/07* (2006.01)
*G06T 1/00* (2006.01)
*G09G 5/36* (2006.01)

(52) U.S. Cl.
CPC ............ *G06K 19/0716* (2013.01); *G06T 1/20* (2013.01); *G06T 1/00* (2013.01); *G09G 5/363* (2013.01)

(58) Field of Classification Search
CPC .......... G06T 1/00; G06T 1/20; G06T 2210/04; H04W 24/00; G09G 5/363
See application file for complete search history.

(56) References Cited

U.S. PATENT DOCUMENTS

| | | | | |
|---|---|---|---|---|
| 8,031,199 B2* | 10/2011 | Montag | .................. | G09G 5/363 345/520 |
| 8,497,866 B2* | 7/2013 | Daniel | .................. | G09G 5/006 345/554 |
| 9,256,914 B2 | 2/2016 | Zhang et al. | | |

FOREIGN PATENT DOCUMENTS

| | | |
|---|---|---|
| CN | 103428228 | 12/2013 |
| CN | 105630719 | 5/2019 |

* cited by examiner

*Primary Examiner* — Benyam Haile
(74) *Attorney, Agent, or Firm* — JCIPRNET

(57) ABSTRACT

The disclosure provides a display card and an electronic device with a wireless communication function. The display card includes a connection interface circuit, a display chip, a wireless communication chip, and a micro-controller unit. The connection interface circuit is configured to electrically connect the display card to the electronic device. The display chip is disposed in the display card. The wireless communication chip is disposed in the display card. The micro-controller unit is disposed in the display card and is electrically connected to the connection interface circuit, the display chip, and the wireless communication chip. In response to the electronic device being in the power off mode, the micro-controller unit receives power for the electronic device through the connection interface circuit and executes the wireless communication function through the wireless communication chip. Therefore, the convenience of the user when operating the electronic device is improved.

19 Claims, 2 Drawing Sheets

DISPLAY CARD AND ELECTRONIC DEVICE WITH WIRELESS COMMUNICATION FUNCTION

CROSS-REFERENCE TO RELATED APPLICATION

This application claims the priority benefit of China application serial no. 202210878936.9, filed on Jul. 25, 2022. The entirety of the above-mentioned patent application is hereby incorporated by reference herein and made a part of this specification.

BACKGROUND

Technical Field

The disclosure relates to a display card, and particularly relates to a display card and an electronic device with wireless communication function.

Description of Related Art

Generally speaking, electronic devices such as notebook computers or desktop computers may be equipped with display cards. When there is a need of image display, the display card may provide a processed image signal to the screen for image display. In addition, the quality and configuration settings of the display card also affect the operational performance of the electronic device.

However, conventional display cards do not support remote control or remote access. When it is necessary to read the setting information of the display card or modify the setting of the display card, the user is able to read and modify the information by accessing the display card only when the electronic device is powered on, which is inconvenient to use.

SUMMARY

In view of this, the disclosure provides a display card and an electronic device with a wireless communication function, thereby improving the convenience of the user when operating the electronic device.

An embodiment of the disclosure provides a display card with a wireless communication function including a connection interface circuit, a display chip, a wireless communication chip, and a micro-controller unit. The connection interface circuit is configured to electrically connect the display card to the electronic device. The display chip is disposed in the display card. The wireless communication chip is disposed in the display card. The micro-controller unit is disposed in the display card and is electrically connected to the connection interface circuit, the display chip, and the wireless communication chip. In response to the electronic device being in a power off mode, the micro-controller unit receives power for the electronic device through the connection interface circuit and executes the wireless communication function through the wireless communication chip.

An embodiment of the disclosure further provides an electronic device including a display card and a main board. The display card is provided with a wireless communication function. The main board is electrically connected to the display card. In response to the electronic device being in the power off mode, the display card receives power for the electronic device through the main board to execute the wireless communication function.

Based on the above, the display card with the wireless communication function may be disposed in the electronic device. Subsequently, in response to the electronic device being in the power off mode, the display card receives power for the electronic device through the main board of the electronic device to execute the wireless communication function. Therefore, the convenience of the user when operating the electronic device is effectively improved.

DESCRIPTION OF THE EMBODIMENTS

Figure 1:
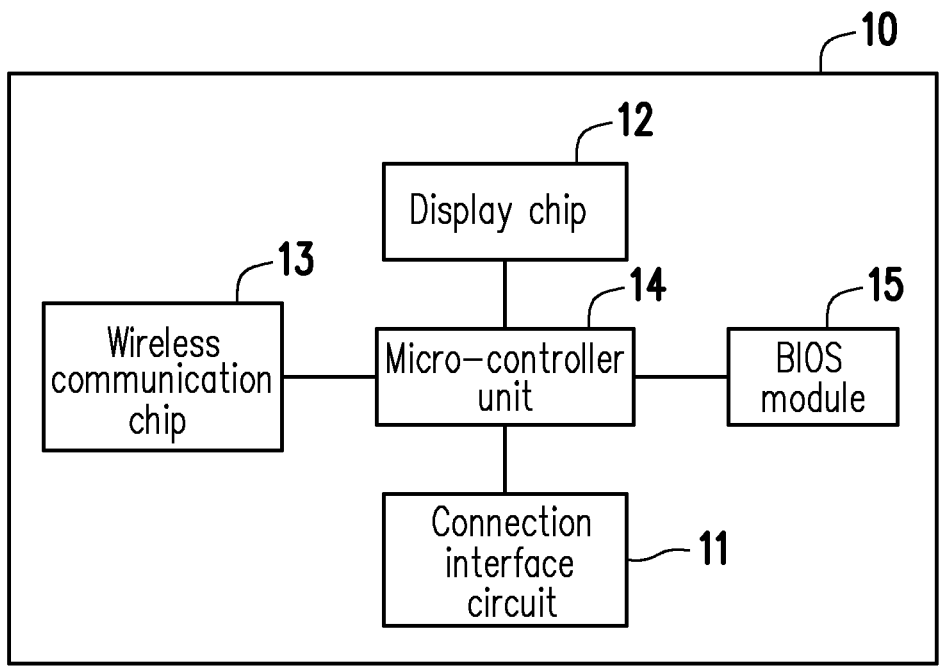
FIG. 1 is a schematic view of a display card with wireless communication function according to an embodiment of the disclosure.

Reference will now be made in detail to the exemplary embodiments of the disclosure, and examples of the exemplary embodiments are illustrated in the accompanying drawings. Whenever possible, the same reference numerals are used in the drawings and the description to indicate the same or similar parts.

FIG. 1 is a schematic view of a display card with wireless communication function according to an embodiment of the disclosure. Referring to FIG. 1, the display card 10 includes a connection interface circuit 11, a display chip 12, a wireless communication chip 13, and a micro-controller unit 14.

The connection interface circuit 11 is configured to electrically connect the display card 10 to the electronic device. For example, the electronic device may include various electronic devices with graphic processing and display functions, such as a notebook computer, a desktop computer, a game console, a Kiosk, or a server. For example, the connection interface circuit 11 may be compatible with various connection interface standards such as peripheral component interconnect express (PCI Express). The type of the connection interface standard compatible with the connection interface circuit 11 is not limited to thereto.

The display chip 12 is disposed in the display card 10. The display chip 12 is configured to perform graphic processing for generating an image signal for displaying an image on a screen. For example, the display chip 12 may include one or more graphic processing units (GPU) or similar graphic processing circuits.

The wireless communication chip 13 is disposed in the display card 10. The wireless communication chip 13 is configured to execute the wireless communication function supported by various wireless communication protocols such as Bluetooth, WiFi, or Near Field Communication (NFC). The type of the wireless communication protocol supported by the wireless communication chip 13 is not limited thereto.

The micro-controller unit (MCU) 14 is disposed in the display card 10 and is electrically connected to the connection interface circuit 11, the display chip 12, and the wireless communication chip 13. The micro-controller unit 14 may be responsible for overall or partial operation of the display card 10. For example, the micro-controller unit 14 is configured to control or coordinate the connection interface circuit 11, the display chip 12, and the wireless communication chip 13. For example, the micro-controller unit 14 may include various control circuits or control chips such as embedded controllers or microcontrollers.

In an embodiment, the display card 10 further includes a basic input/output system (BIOS) module 15. The BIOS module 15 is configured to store and run the basic input/output system of the display card 10.

In response to the electronic device being in a power off mode, the micro-controller unit 14 receives power for the electronic device through the connection interface circuit 11, and executes the wireless communication function through the wireless communication chip 13. That is, in response to the electronic device being in the power off mode, the wireless communication chip 13 and the micro-controller unit 14 may be powered by the power of the electronic and operate normally for executing the wireless communication function. Alternatively, from another point of view, in response to the electronic device being in the power off mode, the electric device or the display card 10 may still perform wireless communication with a remote device through the wireless communication chip 13.

In an embodiment, a power off mode of the electronic device refers to the state in which a majority of the electronic circuit elements inside the electronic device have been powered off or are only powered to a minimum extent after receiving a shutdown signal or a shutdown instruction. In an embodiment, the electronic device may also be operated in a power on mode. In response to the electronic device being powered on, the majority of the electronic circuit elements inside the electronic device are normally powered (e.g., being operated at rated working voltage).

Figure 2:
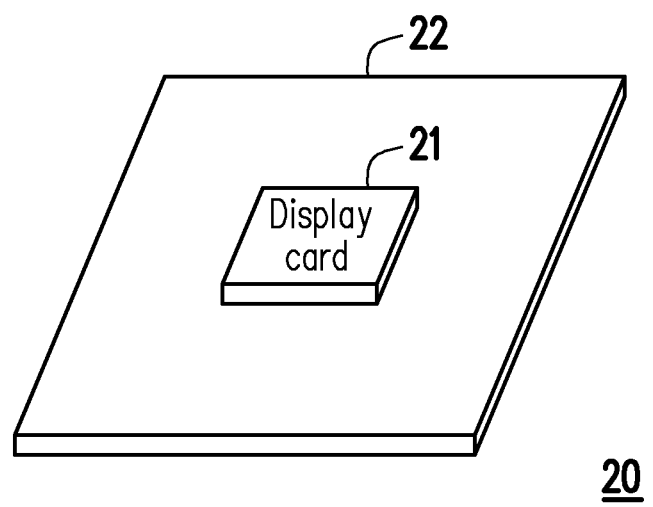
FIG. 2 is a schematic view of an electronic device according to an embodiment of the disclosure.

FIG. 2 is a schematic view of an electronic device according to an embodiment of the disclosure. Referring to FIG. 2, the electronic device 20 includes a display card 21 and a main board 22. The display card 21 is provided with a wireless communication function. For example, the display card 21 may include the display card 10 of FIG. 1. The main board 22 is electrically connected to the display card 21. In an embodiment, the display card 21 is mounted on the main board 22 by soldering or being inserted into a slot. In an embodiment, the connection interface circuit 11 of FIG. 1 is configured to electrically connect various electronic circuits in the display card 21, such as the display chip 12, the wireless communication chip 13, the micro-controller unit 14, and the BIOS module 15, to the main board 22.

In an embodiment, the electronic device 20 may further include various electronic circuits or peripheral devices such as a central processing unit (CPU), a storage circuit, a power supply circuit, a network card, a screen, a keyboard, a touchpad, and a mouse. In an embodiment, the various electronic circuits or peripheral devices is electrically connected to the main board 22 for interactive operation.

Figure 3:
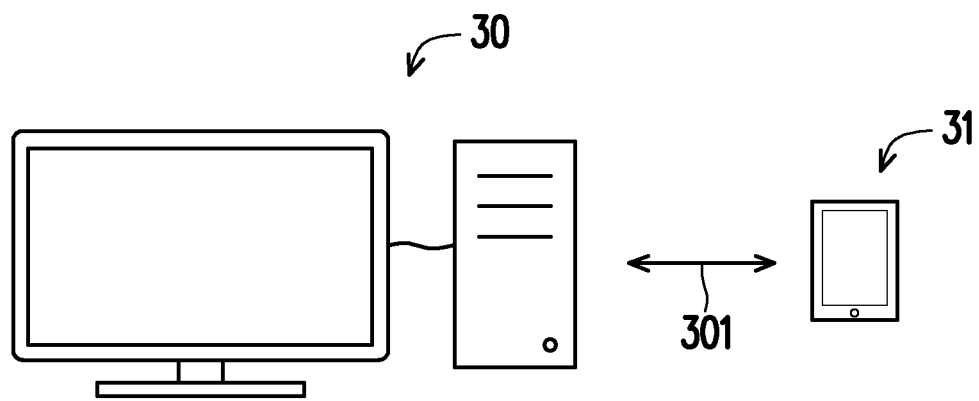
FIG. 3 is a schematic view of the electronic device and a remote device performing wireless communication according to an embodiment of the disclosure.

FIG. 3 is a schematic view of the electronic device and a remote device performing wireless communication according to an embodiment of the disclosure. Referring to FIG. 3, the electronic device 30 includes the electronic device 20 of FIG. 2. A remote device 31 includes various electronic devices with wireless communication function, such as a smart phone, a tablet computer, a notebook computer, a desktop computer, a game console, a Kiosk, or a server.

The electronic device 30 may perform wireless communication with the remote device 31 through a wireless connection 301. For example, the wireless connection 301 may be established based on various wireless communication protocols such as Bluetooth, Wi-Fi, or NFC. Therefore, in response to the electronic device 30 being in the power off mode, the electronic device 30 may establish the wireless connection 301 with the remote device 31 through the wireless communication chip 13 of FIG. 1 and perform wireless communication with the remote device 31 through the wireless connection 301.

In an embodiment, in response to the electronic device 30 being in the power off mode (i.e., a majority of the electronic circuit elements inside the electronic device 30 have been powered off or are only powered to a minimum extent after receiving a shutdown signal or a shutdown instruction), the micro-controller unit 14 may provide setting information of the display chip 12 to the remote device 31 through the wireless communication function provided by the wireless communication chip 13. For example, the setting information of the display chip 12 may include various internal information stored inside the display chip 12, such as the core working frequency, the working frequency of the memory, the power dissipation limit, the working voltage, the memory timing, and the version information of the display chip 12.

In an embodiment, in response to the electronic device 30 being in the power off mode, the micro-controller unit 14 may receive a query request from the remote device 31 through the wireless communication function (or the wireless connection 301). The query request is configured to query the setting information of the display chip 12. In response to the query request, the micro-controller unit 14 extracts at least one of the internal setting information of the display chip 12 and transmits the extracted setting information to the remote device 31 through the wireless communication function (or the wireless connection 301). Alternatively, from another point of view, in response to the electronic device 30 being in the power off mode, the remote device 31 may obtain the setting information of the display chip 12 by accessing the electronic device 30 remotely through the wireless connection 301.

In an embodiment, in response to the electronic device 30 being in the power off mode, the micro-controller unit 14 may execute the wake onLAN (remote wake up) of the electronic device 30 through the wireless communication function provided by the wireless communication chip 13. In an embodiment, in response to the electronic device 30 being in the power off mode, the micro-controller unit 14 may receive a power on request from the remote device 31 through the wireless communication function (or the wireless connection 301). The power on request may be configured to remotely turn on the electronic device 30. In response to the power on request, the micro-controller unit 14 may turn on the electronic device 30 through the connection interface circuit 11 (or the main board 22). For example, in response to the power on request, the micro-controller unit 14 may send a wake-up signal to the main board 22 through the connection interface circuit 11. In response to the wake-up signal, the electronic device 30 is turned on (or woken up) and switched to power on mode.

In an embodiment, in response to the electronic device 30 being in the power off mode, the micro-controller unit 14 may control the basic input/output system of the electronic device 30 through the wireless communication function provided by the wireless communication chip 13. For example, the basic input/output system of the electronic device 30 may include the basic input/output system of the display card 10 and/or the basic input/output system of the main board 22.

In an embodiment, in response to the electronic device 30 being in the power off mode, the micro-controller unit 14 may receive an adjustment request from the remote device 31 through the wireless communication function (or the wireless connection 301) provided by the wireless communication chip 13. The adjustment request may be configured to remotely adjust the basic input/output system of the electronic device 30. In response to the adjustment request, the micro-controller unit 14 may adjust settings of the basic input/output system of the display card 10 and/or the main board 22. For example, in response to the adjustment request, the micro-controller unit 14 may adjust the core working frequency, the working frequency of the memory, the power dissipation limit, the working voltage, and/or the memory timing of the display chip 12 and/or the main board 22.

To sum up, the wireless communication chip is customized and disposed in the display card, and the display card is installed on the circuit board of the electronic device. Afterwards, in response to the electronic device being in the power off mode, the remote device may remotely access the electronic device through the wireless communication function provided by the display card, thereby executing the query on the setting information of the display chip, the wake onLAN of the electronic device, and/or the remote control of the basic input/output system, etc. The convenience of the user when operating the electronic device is effectively improved.

Finally, it should be noted that the above embodiments are only used to illustrate the technical solutions of the disclosure and are not intended to limit it. Although the disclosure has been described in detail with reference to the above embodiments, persons of ordinary skill in the art should understand that they may still modify the technical solutions described in the above embodiments, or replace some or all of the technical features therein with equivalents, and that such modifications or replacements of corresponding technical solutions do not substantially deviate from the scope of the technical solutions of the embodiments of the disclosure.

What is claimed is:

1. A display card with wireless communication function, comprising:
    a connection interface circuit, configured to electrically connect the display card to an electronic device,
    a display chip, disposed in the display card; and
    a wireless communication chip, disposed in the display card,
    a micro-controller unit, disposed in the display card and electrically connected to the connection interface circuit, the display chip, and the wireless communication chip,
    wherein in response to the electronic device being in a power off mode, the micro-controller unit receives power for the electronic device through the connection interface circuit and executes the wireless communication function through the wireless communication chip, and
    in response to the electronic device being in the power off mode, the micro-controller unit provides setting information of the display chip to a remote device through the wireless communication function.

2. The display card according to claim 1, wherein in response to the electronic device being in the power off mode, providing the setting information of the display chip to the remote device by the micro-controller unit through the wireless communication function comprises:
    receiving a query request from the remote device through the wireless communication function by the micro-controller unit in response to the electronic device being in the power off mode; and
    transmitting the setting information of the display chip to the remote device by the micro-controller unit through the wireless communication function in response to the query request.

3. The display card according to claim 1, wherein in response to the electronic device being in the power off mode, the micro-controller unit executes wake onLAN of the electronic device through the wireless communication function.

4. The display card according to claim 3, wherein in response to the electronic device being in the power off mode, executing the wake onLAN of the electronic device by the micro-controller unit through the wireless communication function comprises:
    receiving a power on request from a remote device through the wireless communication function by the micro-controller unit in response to the electronic device being in the power off mode; and
    turning on the electronic device through the connection interface circuit by the micro-controller unit in response to the power on request.

5. The display card according to claim 1, wherein in response to the electronic device being in the power off mode, the micro-controller unit controls a basic input/output system of the electronic device through the wireless communication function.

6. The display card according to claim 5, wherein in response to the electronic device being in the power off mode, controlling the basic input/output system of the electronic device by the micro-controller unit through the wireless communication function comprises:
    receiving an adjustment request from a remote device through the wireless communication function by the micro-controller unit in response to the electronic device being in the power off mode; and
    adjusting settings of the basic input/output system by the micro-controller unit in response to the adjustment request.

7. An electronic device, comprising:
    a display card with a wireless communication function; and
    a main board, electrically connected to the display card,
    wherein in response to the electronic device being in a power off mode, the display card receives power for the electronic device through the main board to execute the wireless communication function, and
    in response to the electronic device being in the power off mode, the display card executes wake onLAN of the electronic device through the wireless communication function.

8. The electronic device according to claim 7, wherein the display card comprises a wireless communication chip.

9. The electronic device according to claim 7, wherein in response to the electronic device being in the power off mode, the display card provides setting information of a display chip to a remote device through the wireless communication function.

10. The electronic device according to claim 9, wherein in response to the electronic device being in the power off mode, providing the setting information of the display chip to the remote device by the display card through the wireless communication function comprises:

receiving a query request from the remote device by the display card through the wireless communication function in response to the electronic device being in the power off mode; and transmitting the setting information to the remote device by the display card through the wireless communication function in response to the query request.

11. The electronic device according to claim 7, wherein in response to the electronic device being in the power off mode, executing the wake onLAN of the electronic device by the display card through the wireless communication function comprises:

receiving a power on request from a remote device by the display card through the wireless communication function in response to the electronic device being in the power off mode; and turning on the electronic device by the display card through the main board in response to the power on request.

12. The electronic device according to claim 7, wherein in response to the electronic device being in the power off mode, the display card controls a basic input/output system of the electronic device through the wireless communication function.

13. The electronic device according to claim 12, wherein in response to the electronic device being in the power off mode, controlling the basic input/output system of the electronic device by the display card through the wireless communication function comprises:

receiving an adjustment request from a remote device by the display card through the wireless communication function in response to the electronic device being in the power off mode; and adjusting settings of the basic input/output system by the display card in response to the adjustment request.

14. A display card with wireless communication function, comprising:

a connection interface circuit, configured to electrically connect the display card to an electronic device, a display chip, disposed in the display card; and a wireless communication chip, disposed in the display card, a micro-controller unit, disposed in the display card and electrically connected to the connection interface circuit, the display chip, and the wireless communication chip, wherein in response to the electronic device being in a power off mode, the micro-controller unit receives power for the electronic device through the connection interface circuit and executes the wireless communication function through the wireless communication chip, and in response to the electronic device being in the power off mode, the micro-controller unit controls a basic input/output system of the electronic device through the wireless communication function.

15. The display card according to claim 14, wherein in response to the electronic device being in the power off mode, the micro-controller unit provides setting information of the display chip to a remote device through the wireless communication function.

16. The display card according to claim 15, wherein in response to the electronic device being in the power off mode, providing the setting information of the display chip to the remote device by the micro-controller unit through the wireless communication function comprises:

receiving a query request from the remote device through the wireless communication function by the micro-controller unit in response to the electronic device being in the power off mode; and transmitting the setting information of the display chip to the remote device by the micro-controller unit through the wireless communication function in response to the query request.

17. The display card according to claim 14, wherein in response to the electronic device being in the power off mode, the micro-controller unit executes wake onLAN of the electronic device through the wireless communication function.

18. The display card according to claim 17, wherein in response to the electronic device being in the power off mode, executing the wake onLAN of the electronic device by the micro-controller unit through the wireless communication function comprises:

receiving a power on request from a remote device through the wireless communication function by the micro-controller unit in response to the electronic device being in the power off mode; and turning on the electronic device through the connection interface circuit by the micro-controller unit in response to the power on request.

19. The display card according to claim 14, wherein in response to the electronic device being in the power off mode, controlling the basic input/output system of the electronic device by the micro-controller unit through the wireless communication function comprises:

receiving an adjustment request from a remote device through the wireless communication function by the micro-controller unit in response to the electronic device being in the power off mode; and adjusting settings of the basic input/output system by the micro-controller unit in response to the adjustment request.

* * * * *